United States Patent
Xu et al.

(10) Patent No.: US 10,836,947 B2
(45) Date of Patent: Nov. 17, 2020

(54) WATER-BASED DRILLING FLUIDS FOR DEEPWATER DRILLING AND USE THEREOF

(71) Applicants: Yangtze University, Hubei (CN); CNOOC China Limited, Zhanjiang Branch, Guangdong, Guangdong (CN)

(72) Inventors: Mingbiao Xu, Hubei (CN); Zhong Li, Guangdong (CN); Fuchang You, Hubei (CN); Yanjun Li, Guangdong (CN); Hexing Liu, Guangdong (CN); Shanshan Zhou, Hubei (CN)

(73) Assignees: Yangtze University, Jingzhou (CN); CNOOC China Limited, Zhanjiang Branch, Guangdong, Zhanjiang (CN)

( * ) Notice: Subject to any disclaimer, the term of this patent is extended or adjusted under 35 U.S.C. 154(b) by 0 days.

(21) Appl. No.: 16/288,080

(22) Filed: Feb. 27, 2019

(65) Prior Publication Data
US 2019/0300772 A1    Oct. 3, 2019

(30) Foreign Application Priority Data
Mar. 27, 2018    (CN) .......................... 2018 1 0258761

(51) Int. Cl.
| | | |
|---|---|---|
| *E21B 7/12* | (2006.01) |
| *E21B 21/00* | (2006.01) |
| *C09K 8/12* | (2006.01) |
| *C09K 8/08* | (2006.01) |
| *C09K 8/52* | (2006.01) |

(52) U.S. Cl.
CPC .................. *C09K 8/12* (2013.01); *C09K 8/08* (2013.01); *C09K 8/52* (2013.01); *E21B 7/12* (2013.01); *E21B 21/001* (2013.01); *C09K 2208/22* (2013.01); *C09K 2208/34* (2013.01)

(58) Field of Classification Search
CPC ........ C09K 8/08; C09K 2208/12; C09K 8/12; C09K 8/032; C09K 8/10; C09K 8/5758; C09K 2208/34; C09K 8/514; E21B 21/001; E21B 21/003; E21B 7/12
See application file for complete search history.

(56) References Cited

U.S. PATENT DOCUMENTS

| 9,920,582 B2 * | 3/2018 | Subhahani | ............... C09K 8/08 |
| 2008/0318810 A1 * | 12/2008 | Merli | ........................ C09K 8/36 507/133 |
| 2014/0128295 A1 * | 5/2014 | Wagles | .................... C09K 8/08 507/111 |

* cited by examiner

*Primary Examiner* — Zakiya W Bates
(74) *Attorney, Agent, or Firm* — Wayne & Ken, LLC; Tony Hom

(57) ABSTRACT

A water-based drilling fluid for deepwater drilling includes 0.1%-1.0% by weight of a viscosifier, 0.1%-1.0% by weight of an acidity regulator, 0.5%-3.5% by weight of a filtrate loss reducer, 0.5%-1.5% by weight of a low-temperature yield point enhancer, 1.0%-5.0% by weight of a shale inhibitor, 15%-25% by weight of a hydrate inhibitor, 1.0%-3.0% by weight of a lubricant, 5.0%-10.0% by weight of a temporary plugging agent and seawater.

10 Claims, No Drawings

WATER-BASED DRILLING FLUIDS FOR DEEPWATER DRILLING AND USE THEREOF

CROSS-REFERENCE TO RELATED APPLICATIONS

This application claims the benefit of priority from Chinese Patent Application No. CN201810258761.5, filed on Mar. 27, 2018. The content of the aforementioned application, including any intervening amendments thereto, is incorporated herein by reference in its entirety.

TECHNICAL FIELD

The present application relates to petroleum drilling engineering, and specifically to a water-based drilling fluid for deepwater drilling and uses thereof.

BACKGROUND

Seas contain a large amount of unexploited oil, especially in the deep waters. With an increasing demand for energy sources, the offshore petroleum exploration tends to focus on deep water drilling. However, deep water is often accompanied by high pressure and low temperature, and is close to 0° C. near the seabed mud line, which brings a great challenge for deepwater and ultra-deepwater drilling projects. There exists some problems such as pipe blockage by natural gas hydrate, undercompacted formation in the vicinity of mud line and low fracture pressure. When the drilling fluid circulates near the mud line, the drill fluid may leak off into the formation and cause a drilling failure due to extremely low temperature near the seabed mud line and excessive viscosity of the drilling fluid. Furthermore, after returning to the sea level, the viscosity of the drilling fluid will be higher due to the long-term cooling by cold seawater, which may result in serious grout runout.

In view of the above characteristics of deepwater petroleum exploration, a lot of researches on drilling fluids have been made worldwide. A concept of "constant rheology" is proposed, that is, constant rheological properties of the drilling fluid in a certain temperature range (4-65° C.), and significant results are obtained. For example, Chinese Patent Nos. CN201010161656.3 and CN201310501155.9 disclose two kinds of water-based drilling fluids with constant rheological properties, but these drilling fluids may easily cause damage to the reservoir.

SUMMARY

In order to overcome the defects in the prior art, the present application provides a water-based drilling fluid for deepwater drilling which has constant rheological property in 4-65° C. and causes no damage to the reservoir.

A water-based drilling fluid for deepwater drilling includes: 0.1%-1.0% by weight of a viscosifier, 0.1%-1.0% by weight of an acidity regulator, 0.5%-3.5% by weight of a filtrate loss reducer, 0.5%-1.5% by weight of a low-temperature yield point enhancer, 1.0%-5.0% by weight of a shale inhibitor, 15%-25% by weight of a hydrate inhibitor, 1.0%-3.0% by weight of a lubricant, 5.0%-10.0% by weight of a temporary plugging agent and seawater.

In some embodiments, the viscosifier is selected from the group consisting of xanthan gum, welan gum, *Gleditisia microphylla* gum, *sophora* bean gum, fenugreek gum, guar gum, konjac gum, *sesbania* gum, karaya gum, tamarind gum, locust bean gum and a mixture thereof.

In some embodiments, the acidity regulator is selected from the group consisting of sodium hydroxide and sodium carbonate.

In some embodiments, the filtrate loss reducer comprises a modified starch.

In some embodiments, the modified starch is produced by:
mixing a raw starch, a base, a haloacetic acid and water for modification to obtain a mixture;
pre-gelatinizing the mixture for modification at 95-105° C. to obtain a pre-gelatinized starch; and
refining the pre-gelatinized starch to obtain the modified starch.

In some embodiments, the low-temperature yield point enhancer is selected from the group consisting of propylene glycol block polyether and polyethylene glycol fatty acid ester.

In some embodiments, the shale inhibitor is selected from the group consisting of a polyamine and potassium chloride.

In some embodiments, the hydrate inhibitor is selected from the group consisting of sodium chloride, ethylene glycol, diethylene glycol and a mixture thereof.

In some embodiments, the lubricant is selected from the group consisting of polyoxyethylene stearate, fatty alcohol polyoxypropylene ether, pentaerythritol stearate, adipic acid polyester and a mixture thereof.

The invention further provides a use method of the water-based drilling fluid for deepwater drilling, comprising:
applying the drilling fluid to oil and gas drilling in deep water or ultra-deep water.

The water-based drilling fluid for deepwater drilling comprises: 0.1%-1.0% by weight of a viscosifier, 0.1%-1.0% by weight of an acidity regulator, 0.5%-3.5% by weight of a filtrate loss reducer, 0.5%-1.5% by weight of a low-temperature yield point enhancer, 1.0%-5.0% by weight of a shale inhibitor, 15%-25% by weight of a hydrate inhibitor, 1.0%-3.0% by weight of a lubricant, 5.0%-10.0% by weight of a temporary plugging agent and seawater.

In the present invention, the viscosifier is used to regulate the low shear rate viscosity of the drilling fluid, thereby preventing the reservoir from being damaged by a low-speed flow of the drilling fluid to the deep reservoir. The filtrate loss reducer and the temporary plugging agent are able to plug the reservoir temporarily, so that the low-temperature yield point enhancer can exert a cloud point effect, thereby increasing the concentration of "oil phase" in the drilling fluid during the rising of temperature and improving the viscosity of the drilling fluid at high temperature under the cloud point effect. Furthermore, the viscosity of the drilling fluid at low temperature is reduced to achieve "constant rheology". The drilling fluid of the invention does not cause damage the reservoir due to high permeability recovery rate after immediate flow back of the drilling fluid.

Results of the examples show that differences in apparent viscosity, plastic viscosity, yield point and 3 rpm reading of a 6-speed rotational viscometer of the drilling fluid under individual temperatures ranging from 4° C. to 65° C. are all less than or equal to 3, which indicates that the drilling fluid has a constant rheological property. In addition, the water-based drilling fluid can effectively protect the reservoir upon instant flow back with a permeability recovery rate greater than or equal to 90%.

DETAILED DESCRIPTION OF EMBODIMENTS

The present application provides a water-based drilling fluid for deepwater drilling, comprising: 0.1%-1.0% by weight of a viscosifier, 0.1%-1.0% by weight of an acidity regulator, 0.5%-3.5% by weight of a filtrate loss reducer, 0.5%-1.5% by weight of a low-temperature yield point enhancer, 1.0%-5.0% by weight of a shale inhibitor, 15%-25% by weight of a hydrate inhibitor, 1.0%-3.0% by weight of a lubricant, 5.0%-10.0% by weight of a temporary plugging agent and seawater.

Unless otherwise specified, each of the components of the water-based drilling fluid is commercially available and well known to those skilled in the art.

The water-based drilling fluid comprises 0.1%-1.0% by weight of a viscosifier, preferably 0.2%-0.7%. The viscosifier is selected from the group consisting of xanthan gum, welan gum, *Gleditisia microphylla* gum, *sophora* bean gum, fenugreek gum, guar gum, konjac gum, *sesbania* gum, karaya gum, tamarind gum, locust bean gum, and a mixture thereof. Preferably, the viscosifier is selected from the group consisting of xanthan gum, fenugreek gum, konjac gum, guar gum, locust bean gum and a mixture thereof more preferably, a mixture comprising xanthan gum as a base material and one or more ingredients selected from fenugreek gum, konjac gum, guar gum or locust bean gum. In the present invention, when the viscosifier is a mixture of several components, there are no special requirements for the weight ratio between individual components.

In an embodiment, the viscosifier is preferably a mixture of 40-50 parts by weight of xanthan gum, 10-20 parts by weight of fenugreek gum, 5-10 parts by weight of konjac gum, 10-20 parts by weight of guar gum and 5-10 parts by weight of locust bean gum. Here, the viscosifier can be used to regulate the low shear rate viscosity of the drilling fluid, thereby preventing the reservoir from being damaged by a low-speed flow of the drilling fluid to the deep in the reservoir.

The water-based drilling fluid for deepwater drilling comprises 0.1%-1.0% by weight of an acidity regulator, preferably 0.3%-0.8%. The acidity regulator is introduced to regulate the pH of the water-based drilling fluid at 8-9. The acidity regulator used herein is preferably selected from sodium hydroxide and sodium carbonate, or a combination thereof. In the present invention, when the acidity regulator is a mixture of sodium hydroxide and sodium carbonate, there are no special requirements for the weight ratio of individual components.

The water-based drilling fluid for deepwater drilling comprises 0.5%-3.5% by weight of a filtrate loss reducer, preferably 1%-3.0%. In some embodiments, the filtrate loss reducer is preferably a modified starch. In some embodiments, the modified starch is produced by:

mixing a raw starch, a base, a haloacetic acid and water for modification to obtain a mixture;

pre-gelatinizing the mixture for modification at 95-105° C. to obtain a pre-gelatinized starch; and refining the pre-gelatinized starch to obtain the modified starch.

In some embodiments, the mixture preferably comprises 80-110, more preferably 88-103 parts by weight of the raw starch. The raw starch used herein preferably comprises potato starch, tapioca starch and *Canna edulis* Ker starch, where a weight ratio of potato starch to tapioca starch to *Canna edulis* Ker starch is preferably 40-50: 20-30:20-30, and more preferably 42-48: 23-27:23-28.

The mixture preferably comprises 1-2, more preferably 1.2-1.8 parts of the base based on the weight of the raw starch. The base preferably comprises sodium hydroxide.

The mixture preferably comprises 5-10, more preferably 6-8 parts of the haloacetic acid based on the weight of the raw starch. The haloacetic acid is preferably chloroacetic acid or bromoacetic acid.

The mixture preferably comprises 120-150, more preferably 125-145 parts of water based on the weight of the raw starch.

There are no special requirements for the manner of mixing the raw starch, the base, the haloacetic acid and water. Any mixing methods known to those skilled in the art may be employed.

The obtained mixture is preferably pre-gelatinized, such that the starch can be hydroxyethylated. The pre-gelatinizing temperature is preferably 95-105° C., and more preferably 97-102° C. In some embodiments, the pre-gelatinizing modification is preferably carried out by a screw extruder. There are no special requirements for the implementations of pre-gelatinizating. Any pre-gelatinizing methods known to those skilled in the art may be employed.

The pre-gelatinized starch of the invention is preferably refined to produce the modified starch. There are no special requirements for the implementations of refining. Any refining methods known to those skilled in the art may be employed. In some embodiments, the refined pre-gelatinized starch is sifted to obtain the modified starch. In some embodiments, a sieve size is preferably 100 mesh or more, and more preferably 150-200 mesh.

The filtrate loss reducer used herein substantially reduce the filtrate loss to facilitate the flowback. Moreover, the filtrate loss reducer may be dissolved with an acid, thereby effectively reducing the damage to the reservoir.

In some embodiments, the water-based drilling fluid for deepwater drilling comprises 0.5%-1.5%, preferably 0.8%-1.2% by weight of the low-temperature yield point enhancer. The low-temperature yield point enhancer used herein preferably comprises propylene glycol block polyether and/or polyethylene glycol fatty acid ester, and more preferably propylene glycol block polyether and polyethylene glycol fatty acid ester. In some embodiments, a weight ratio of the propylene glycol block polyether to the polyethylene glycol fatty acid ester is preferably 40-60:40-60, and more preferably 45-55:45-55. The low-temperature yield point enhancer of the invention has little effect on the rheology of the drilling fluid at low temperature, especially at a temperature lower than 15° C. When the temperature is higher than 15° C., the low-temperature yield point enhancer may change from hydrophilic to lipophilic as the temperature increases, increasing the viscosity of the drilling fluid. The change in property may be more obvious as the temperature increases, such that the decrease in viscosity of the drilling fluid caused by the increase of temperature may be compensated, allowing for constant rheology of the drilling fluid at varying temperatures.

In some embodiments, the water-based drilling fluid for deepwater drilling comprises 1.0%-5.0%, preferably 1.5%-4% by weight of the shale inhibitor. The shale inhibitor preferably comprises a polyamine and/or potassium chloride, and more preferably polyamine and potassium chloride. In some embodiments, when the shale inhibitor is a mixture of the polyamine and potassium chloride, a weight ratio of the polyamine to potassium chloride is preferably 15-40: 60-80, and more preferably 20-25: 75-85. There are no special requirements for the polyamine. Any products commercially available and known to those skilled in the art may be employed. Here, the shale inhibitor can be used to inhibit the mud formed by the hydration of mudstone in the formation, thus maintaining the constant rheology of the drilling fluid.

In some embodiments, the water-based drilling fluid for deepwater drilling comprises 15%-25%, preferably 18%-24% by weight of the hydrate inhibitor. The hydrate inhibitor is preferably selected from the group consisting of sodium chloride, ethylene glycol, diethylene glycol and a mixture thereof; and more preferably sodium chloride, ethylene glycol or diethylene glycol. When the hydrate inhibitor is a mixture of several components, there are no special requirements for the weight ratio between individual components. In some embodiments, the hydrate inhibitor is capable of thermodynamically lowering the conditions for hydrate formation, such that when the drilling fluid passes through the low-temperature region of the seabed during drilling, the hydrate formation caused by the intrusion of gas is prevented, reducing the influence on the drilling results.

In some embodiments, the water-based drilling fluid for deepwater drilling comprises 1.0%-3.0%, preferably 1.5%-2.5% by weight of the lubricant. Preferably, the lubricant comprises polyoxyethylene stearate, fatty alcohol polyoxypropylene ether, pentaerythritol stearate and adipic acid polyester, where a weight ratio of polyoxyethylene stearate to fatty alcohol polyoxypropylene ether to pentaerythritol stearate to adipic acid polyester is preferably (30-40):(20-30):(10-20):(10-20), and more preferably (32-37):(22-28):(12-18):(12-18). Here, the lubricant can be used to improve the lubricating property of the drilling fluid.

In some embodiments, the water-based drilling fluid for deepwater drilling comprises 5.0%-10.0%, preferably 6.0%-8.0% by weight of the temporary plugging agent. In some embodiments, the temporary plugging agent is preferably calcium carbonate. In some embodiments, an acid solubility of the calcium carbonate is preferably 98% or more, and more preferably 98.5%-99%. In some embodiments, D90 value of the calcium carbonate is less than 75 μm, preferably 40-74 μm; D50 value of the calcium carbonate is preferably 50-60 μm, and more preferably 52-58 μm; and D10 value of the calcium carbonate is preferably greater than 40 μm, preferably 41-50 μm. The calcium carbonate provides a plugging effect to appropriately plug the pore throat in combination of other components, allowing for a rapid detachment and flowback to protect the reservoir in the later oil and gas production.

The water-based drilling fluid for deepwater drilling further comprises seawater. There are no special requirements for the seawater. Any seawater known to those skilled in the art may be employed.

In the present invention, the water-based drilling fluid for deepwater drilling has constant rheology, and differences in apparent viscosity, plastic viscosity, yield point and 3 rpm reading of the 6-speed rotational viscometer of the drilling fluid between individual temperatures ranging from 4° C. to 65° C. are preferably and independently less than or equal to 3, and more preferably 1-2. The permeability recovery rate after immediate flowback is preferably 90% or more, and more preferably 92%-100%. A suitable temperature of the water-based drilling fluid for deepwater drilling is preferably 20-150° C., and more preferably 50-130° C.

In the present invention, preferably, the water-based drilling fluid for deepwater drilling is produced by mixing the raw materials as defined above. There are no special requirements for the mixing modes. Any mixing methods known to those skilled in the art may be employed.

The present invention further provides a use of the water-based drilling fluid for deepwater drilling in oil and gas drilling in deep water and ultra-deep water. The oil and gas drilling in deep water and ultra-deep water is known to those skilled in the art. There are no special requirements for the application of the water-based drilling fluid for deepwater drilling. Any applications well known to those skilled in the art may be employed.

The water-based drilling fluid for deepwater drilling of the invention and uses thereof will be illustrated in detail below with reference to the embodiments, but these embodiments are not intended to limit the scope of the invention.

Example 1

In this embodiment, composition of a water-based drilling fluid for deepwater drilling was: 0.1% by weight of a viscosifier, 0.1% by weight of an acidity regulator, 3.5% by weight of a filtrate loss reducer, 1.5% by weight of a low-temperature yield point enhancer, 5.0% by weight of a shale inhibitor, 15% by weight of a hydrate inhibitor, 1.0% by weight of a lubricant, 10.0% by weight of a temporary plugging agent and seawater.

The viscosifier was prepared by mixing xanthan gum, fenugreek gum, konjac gum, guar gum and locust bean gum in a weight ratio of 40:20:10:5.

The acidity regulator was sodium hydroxide.

The filtrate loss reducer was a modified starch which was prepared as follows. 50 parts by weight of potato starch, 20 parts by weight of tapioca starch, 20 parts by weight of *Canna edulis* Ker starch, 1 part by weight of sodium hydroxide, 5 parts by weight of a haloacetic acid and 150 parts by weight of deionized water were mixed and then injected into a screw extruder at 100° C. The mixture of raw materials was pre-gelatinized and dried immediately to produce a pre-gelatinized starch after extruded from the outlet of the screw extruder. The pre-gelatinized starch was subjected to coarse crushing, finely ground, and passed through a 100-mesh sieve to obtain the modified starch.

The low-temperature yield point enhancer was propylene glycol block polyether.

The shale inhibitor was prepared by mixing potassium chloride and a polyamine in a weight ratio of 80:20.

The hydrate inhibitor was sodium halide.

The lubricant was prepared from 40 parts by weight of polyoxyethylene stearate, 20 parts by weight of fatty alcohol polyoxypropylene ether, 20 parts by weight of pentaerythritol stearate and 20 parts by weight of adipic acid polyester polyol.

The temporary plugging agent was calcium carbonate with acid solubility of 98% and D50 of 60 μm.

The rest of the components of the drilling fluid was seawater.

Basic properties of the water-based drilling fluid for deepwater drilling in this embodiment were tested according to a conventional method, and the results were shown in Table 1. The reservoir protection of the water-based drilling fluid in this embodiment for the was tested according to a conventional method, and the results were shown in Table 2. The anti-pollution performance of the water-based drilling fluid was tested under the pollution of drilling cutting powder or seawater, and the results were shown in Table 3.

Example 2

In this embodiment, composition of a water-based drilling fluid for deepwater drilling was: 0.5% by weight of a viscosifier, 0.5% by weight of an acidity regulator, 1.5% by weight of a filtrate loss reducer, 0.5% by weight of a low-temperature yield point enhancer, 1.0% by weight of a shale inhibitor, 25% by weight of a hydrate inhibitor, 3.0% by weight of a lubricant, 5.0% by weight of a temporary plugging agent and seawater.

The viscosifier was xanthan gum.

The acidity regulator was prepared by mixing sodium hydroxide and sodium carbonate in a weight ratio of 1:3.

The filtrate loss reducer was a modified starch which was prepared as follows. 40 parts by weight of potato starch, 30 parts by weight of tapioca starch, 30 parts by weight of *Canna edulis* Ker starch, 2 parts by weight of sodium hydroxide, 10 parts by weight of a haloacetic acid and 120 parts by weight of deionized water were mixed to produce the modified starch according to the method in Example 1, and the difference is that the temperature of the screw extruder was 95° C.

The low-temperature yield point enhancer was polyethylene glycol fatty acid ester.

The shale inhibitor was a polyamine.

The hydrate inhibitor was ethylene glycol.

The lubricant was prepared by mixing polyoxyethylene stearate, fatty alcohol polyoxypropylene ether, pentaerythritol stearate and adipic acid polyester polyol in a weight ratio of 30:20:20:10.

The temporary plugging agent was calcium carbonate with acid solubility of 98% and D50 of 50 μm.

The rest of the components of the drilling fluid was seawater.

The basic properties, reservoir protection and anti-pollution performance of the water-based drilling fluid for deepwater drilling in this embodiment were tested according to the methods in Example 1, and the results were respectively shown in Tables 1-3.

Example 3

In this embodiment, composition of a water-based drilling fluid for deepwater drilling was: 1.0% by weight of a viscosifier, 1.0% by weight of an acidity regulator, 2.5% by weight of a filtrate loss reducer, 1.0% by weight of a low-temperature yield point enhancer, 3.0% by weight of a shale inhibitor, 20% by weight of a hydrate inhibitor, 2.0% by weight of a lubricant, 8.0% by weight of a temporary plugging agent and seawater.

In the drilling fluid, the viscosifier was prepared from 3 parts by weight of xanthan gum, 20 parts by weight of tamarind gum, 20 parts by weight of locust bean gum and 30 parts by weight of *Gleditisia microphylla* gum.

The acidity regulator was sodium carbonate.

The filtrate loss reducer was a modified starch that was prepared as follows. 40 parts by weight of potato starch, 20 parts by weight of tapioca starch, 20 parts by weight of *Canna edulis* Ker starch, 2 parts by weight of sodium hydroxide, 10 parts by weight of a haloacetic acid and 130 parts by weight of deionized water were mixed to produce the modified starch according to the method in Example 1, and the difference is that the temperature of the screw extruder was 105° C.

The low-temperature yield point enhancer was polyethylene glycol fatty acid ester.

The shale inhibitor was a polyamine.

The hydrate inhibitor was diethylene glycol.

The lubricant was prepared by mixing polyoxyethylene stearate, fatty alcohol polyoxypropylene ether, pentaerythritol stearate and adipic acid polyester polyol in a weight ratio of 40:30:10:10.

The temporary plugging agent was calcium carbonate with an acid solubility of 98% and D50 value of 55 μm.

The rest of the components of the drilling fluid was seawater.

The basic properties, reservoir protection and anti-pollution performance of the water-based drilling fluid for deepwater drilling in this embodiment were tested according to the methods in Example 1, and the results were respectively shown in Tables 1-3.

Example 4

In this embodiment, composition of a water-based drilling fluid for deepwater drilling was: 0.6% by weight of a viscosifier, 0.6% by weight of an acidity regulator, 2.0% by weight of a filtrate loss reducer, 1.0% by weight of a low-temperature yield point enhancer, 2.0% by weight of a shale inhibitor, 20% by weight of a hydrate inhibitor, 2.0% by weight of a lubricant, 7.0% by weight of a temporary plugging agent and seawater for the rest.

The viscosifier was prepared by mixing xanthan gum, fenugreek gum, konjac gum, guar gum and locust bean gum in a weight ratio of 50:20:5:20:5.

The acidity regulator was prepared by mixing sodium hydroxide and sodium carbonate in a weight ratio of 1:2.

The filtrate loss reducer was a modified starch, which was prepared as follows. 50 parts by weight of potato starch, 30 parts by weight of tapioca starch, 30 parts by weight of *Canna edulis* Ker starch, 2 parts by weight of sodium hydroxide, 10 parts by weight of a haloacetic acid and 150 parts by weight of deionized water were mixed to produce the modified starch according to the method in Example 1, and the difference is that the temperature of the screw extruder was 102° C.

The low-temperature yield point enhancer was prepared by mixing propylene glycol block polyether and polyethylene glycol fatty acid ester in a weight ratio of 40:60.

The shale inhibitor was prepared by mixing potassium chloride and a polyamine in a weight ratio of 60:40.

The hydrate inhibitor was prepared by sodium halide, ethylene glycol and diethylene glycol in a weight ratio of 1:1:1.

The lubricant was prepared by mixing polyoxyethylene stearate, fatty alcohol polyoxypropylene ether, pentaerythritol stearate and adipic acid polyester polyol in a weight ratio of 30:30:20:20.

The temporary plugging agent was calcium carbonate with an acid solubility of 99% and D50 of 58 μm.

The basic properties, reservoir protection and anti-pollution performance of the water-based drilling fluid for deepwater drilling in this embodiment were tested according to the methods in Example 1, and the results were respectively shown in Tables 1-3.

Comparative Example 1

In this embodiment, composition of a PRD drilling fluid was: seawater, 0.1% by weight of sodium hydroxide, 0.2% by weight of sodium carbonate, 0.7% by weight of a VIS viscosifier, 0.2% by weight of a cationic modified starch, 2% by weight of a polyalcohol and 3% by weight of potassium chloride.

The basic properties and reservoir protection of the PRD drilling fluid were tested according to the methods in Example 1, and the results were respectively shown in Tables 1 and 2.

Comparative Example 2

In this embodiment, composition of a potassium chloride polymer was: seawater, 3% by weight of a bentonite, 0.1% by weight of sodium hydroxide, 0.2% by weight of sodium carbonate, 0.4% by weight of a polyanionic cellulose, 0.5% by weight of polyacrylamide, 5% by weight of potassium chloride, 1.5% by weight of hydroxypropyl starch, 1.0% by weight of sulfonated gilsonite, 1.5% by weight of sulfomethal phenolaldehy resin and 30% by weight of barite.

The basic properties and reservoir protection of the potassium chloride polymer drilling fluid were tested according to the methods in Example 1, and the results were respectively shown in Tables 1 and 2.

TABLE 1

Test results of basic properties of drilling fluids in Comparative Examples 1-2 and Examples 1-4

| Drilling fluids | T(° C.) | $T_{test}$(° C.) | AV(mPa · s) | PV(mPa · s) | YP(Pa) | φ3 | API(mL) |
|---|---|---|---|---|---|---|---|
| Comparative Example 1 | 90 | 4 | 40 | 20 | 20 | 24 | 4.4 |
| | | 30 | 31 | 16 | 15 | 18 | |
| | | 65 | 24 | 12 | 12 | 14 | |
| Comparative Example 2 | 120 | 4 | 51 | 30 | 21 | 18 | 4.0 |
| | | 30 | 36 | 22 | 14 | 12 | |
| | | 65 | 25 | 17 | 8 | 6 | |
| Example 1 | 90 | 4 | 14 | 8 | 6 | 5 | 3.2 |
| | | 30 | 12 | 7 | 5 | 4 | |
| | | 65 | 14 | 8 | 6 | 4 | |
| Example 2 | 120 | 4 | 25 | 14 | 11 | 8 | 3.8 |
| | | 20 | 24 | 14 | 10 | 8 | |
| | | 30 | 23 | 13 | 10 | 6 | |
| | | 40 | 23 | 13 | 10 | 7 | |
| | | 50 | 22 | 13 | 9 | 7 | |
| | | 65 | 22 | 12 | 10 | 7 | |
| Example 3 | 150 | 4 | 31 | 18 | 13 | 11 | 5.4 |
| | | 30 | 28 | 17 | 11 | 10 | |
| | | 65 | 29 | 17 | 12 | 10 | |
| Example 4 | 20 | 4 | 26 | 14 | 12 | 9 | 2.4 |
| | | 30 | 24 | 13 | 11 | 8 | |
| | | 65 | 24 | 13 | 11 | 9 | |

Notes:

T was the aging temperature of drilling fluids;

$T_{test}$ was the test temperature for drilling fluid rheology;

AV was the apparent viscosity of drilling fluids;

PV was the plastic viscosity of drilling fluids;

YP was the yield point of a drilling fluid;

φ3 was 3 rpm reading of 6-speed rotational viscometer, dimensionless; and API was the water loss of a drilling fluid under medium pressure (0.7 MPa, 30 min).

As the results shown in Table 1, the drilling fluids in Comparative Examples 1-2 had a greater loss in apparent viscosity, plastic viscosity, yield point, 3 rpm reading of the 6-speed rotational viscometer, water loss under pressure and permeability recovery with the increase of temperature, indicating a poor stability of the drilling fluids. However, differences of apparent viscosity, plastic viscosity and yield point of the drilling fluids in Examples 1-4 of the application between individual temperatures in 4-65° C. were less than or equal to 3, thereby showing the true constant rheology. Therefore, the drilling fluids in the examples of the application are capable of meeting requirements of deep and ultra-deep water drilling for rheological property at low temperature.

TABLE 2

Test results of reservoir protection of drilling fluids in Comparative Examples 1-2 and Examples 1-4

| Drilling fluida | $K_{immediate}$ % | $K_{gel-breaking}$ % | $K_{perforation}$ % |
|---|---|---|---|
| Comparative Example 1 | 18.5 | 88.4 | 90.2 |
| Comparative Example 2 | 34.5 | 50.3 | 89.4 |
| Example 1 | 92.6 | 99.2 | 98.2 |
| Example 2 | 98.4 | 100 | 99.2 |
| Example 3 | 93.2 | 98.2 | 99.5 |
| Example 4 | 96.2 | 99.4 | 100 |

Notes:
$K_{immediate}$ was the permeability recovery rate determined from the permeability which was measured upon immediate flowback of the drilling fluid after polluting the core;
$K_{gel-breaking}$ was the permeability recovery rate determined from the permeability which was measured after the drilling fluid polluted the core and then was gel-broken with a gel-breaking fluid;
and $K_{perforation}$ was a permeability recovery rate determined from the permeability which was measured after the drilling fluid polluted the core and then 0.5 cm of the polluted end of the core was cut out (simulating perforation).

It can be seen from Table 2 that for the PRD drilling fluid in Comparative Example 1 and the potassium chloride polymer drilling fluid in Comparative Example 2 upon immediate flowback for well completion, the permeability recovery % were relatively low, so that these drilling fluids were not suitable for open hole completion of horizontal wells because they require gel-breaking or perforated completion to assist in reservoir protection. However, for the water-based drilling fluids for deepwater drilling in Examples 1-4 upon flowback, the permeability recovery rate were greater than 90%, indicating that the water-based drilling fluids of the invention can be immediately subjected to flowback for well completion while keeping constant rheology, thereby protecting the reservoir.

TABLE 3

Test results of anti-pollution performance of water-based drilling fluids for deepwater drilling in Examples 1-4

| Pollutant | T(° C.) | $T_{test}$(° C.) | AV(mPa · s) | PV(mPa · s) | YP(Pa) | φ3 | API |
|---|---|---|---|---|---|---|---|
| 10% Drilling cutting powder | 120 | 4 | 28 | 16 | 12 | 9 | 3.2 |
| | | 30 | 27 | 16 | 11 | 9 | |
| | | 65 | 25 | 14 | 11 | 10 | |
| 10% Seawater | 120 | 4 | 20 | 12 | 8 | 6 | 4.4 |
| | | 30 | 18 | 11 | 7 | 5 | |
| | | 65 | 18 | 10 | 8 | 5 | |

Notes:
T, $T_{test}$, AV, PV, YP, φ3 and API are defined as Table 1.

As shown in Table 3, the pollution of drilling cutting powder and seawater showed little influence on the various parameters of the water-based drilling fluids for deepwater drilling in Examples 1-4, therefore, these drilling fluids exhibited good rheological stability and can meet the requirements for rheological properties of the water-based drilling fluids in deep and ultra-deep water environments.

It can be seen from the above examples that the water-based drilling fluid for deepwater drilling of the invention had both of constant rheology and reservoir protection, such that the drilling fluid can meet the requirements for oil and gas drilling in deep and ultra-deep water environments.

Although the present application has been illustrated in detail in the above embodiments, these embodiments are merely a part of the implementations of the invention. Other embodiments may be obtained based on the above embodiments without departing from the spirit of the invention and should fall within the scope defined by the appended claims.

What is claimed is:

1. A water-based drilling fluid for deepwater drilling, comprising: 0.1%-1.0% by weight of a viscosifier, 0.1%-1.0% by weight of an acidity regulator, 0.5%-3.5% by weight of a filtrate loss reducer, 0.5%-1.5% by weight of a low-temperature yield point enhancer, 1.0%-5.0% by weight of a shale inhibitor, 15%-25% by weight of a hydrate inhibitor, 1.0%-3.0% by weight of a lubricant, 5.0%-10.0% by weight of a temporary plugging agent and seawater.

2. The drilling fluid of claim 1, wherein the viscosifier is selected from the group consisting of xanthan gum, welan gum, *Gleditisia microphylla* gum, *sophora* bean gum, fenugreek gum, guar gum, konjac gum, *sesbania* gum, karaya gum, tamarind gum, locust bean gum and a mixture thereof.

3. The drilling fluid of claim 1, wherein the acidity regulator is selected from the group consisting of sodium hydroxide, sodium carbonate and a mixture thereof.

4. The drilling fluid of claim 1, wherein the filtrate loss reducer comprises a modified starch.

5. The drilling fluid of claim 4, wherein the modified starch is produced by:
   mixing a raw starch, a base, a haloacetic acid and water for modification to obtain a mixture;
   pre-gelatinizing the mixture for modification at 95-105° C. to obtain a pre-gelatinized starch; and
   refining the pre-gelatinized starch to obtain the modified starch.

6. The drilling fluid of claim 1, wherein the low-temperature yield point enhancer is selected from the group consisting of propylene glycol block polyether, polyethylene glycol fatty acid ester, and a mixture thereof.

7. The drilling fluid of claim 1, wherein the shale inhibitor is selected from the group consisting of a polyamine, potassium chloride, and a mixture thereof.

8. The drilling fluid of claim 1, wherein the hydrate inhibitor is selected from the group consisting of sodium chloride, ethylene glycol, diethylene glycol, and a mixture thereof.

9. The drilling fluid of claim 1, wherein the lubricant is selected from the group consisting of polyoxyethylene stearate, fatty alcohol polyoxypropylene ether, pentaerythritol stearate, adipic acid polyester, and a mixture thereof.

10. A method of using the drilling fluid of claim 1, comprising:
   circulating the drilling fluid while oil and gas drilling in deep water or ultra-deep water reservoirs.

\* \* \* \* \*